United States Patent Office 3,284,438
Patented Nov. 8, 1966

3,284,438
PROCESSES FOR MAKING CYCLIC CARBONATE AND CYCLIC THIOCARBONATE ESTERS OF LINCOMYCIN
Fred Kagan, Kalamazoo, and Robert D. Birkenmeyer, Comstock Township, Kalamazoo County, Mich., assignors to The Upjohn Company, Kalamazoo, Mich., a corporation of Delaware
No Drawing. Filed Apr. 20, 1964, Ser. No. 361,225
8 Claims. (Cl. 260—210)

This invention relates to novel processes for making derivatives of the antibiotic lincomycin, and is particularly directed to processes for making cyclic carbonate and cyclic thiocarbonate esters of lincomycin.

Lincomycin is an antibiotic obtained as an elaboration product of a lincomycin-producing actinomycete. Methods for the production, recovery and purification of lincomycin are described in U.S. Patent 3,086,912.

It has now been found that cyclic carbonate esters of lincomycin are obtained by treating lincomycin with tetrahydrofuran and N,N'-carbonyldiimidazole or 4,4'-carbonyl-di-1,2,4-triazole. It has also been found that cyclic thiocarbonate esters of lincomycin are obtained by treating lincomycin with tetrahydrofuran and N,N'-thiocarbonyldiimidazole or 4,4' - thiocarbonyl-di-1,2,4-triazole. Subsequent to this invention, the structure of lincomycin has been elucidated. The cyclic carbonate and cyclic thiocarbonate esters of lincomycin made by the novel processes of this invention, therefore, can now be represented by the following formula:

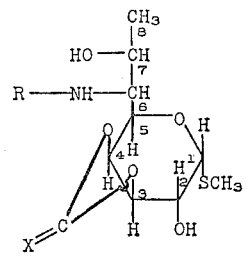

wherein X is O or S; and wherein R is trans-4-propyl-L-hygroyl.

Lincomycin cyclic carbonate can be prepared by reacting equimolar amounts of lincomycin and N,N'-carbonyldiimidazole or 4,4' - carbonyl - di-1,2,4-triazole in tetrahydrofuran. The reaction is preferably conducted at about 40° C. under an inert atmosphere for about one hour. The lincomycin cyclic carbonate so produced is advantageously isolated by evaporating the solvent, extracting the residue with methylene chloride, washing and drying the extract, and evaporating the methylene chloride.

The reaction can be carried out over a period of time (5 minutes to 18 hours) and at various temperatures (0° to reflux). Other suitably inert solvents such as methylene chloride and chloroform can be used.

Lincomycin cyclic thiocarbonate can be made in the same manner as above except N,N'-thiocarbonyldiimidazole or 4,4'-thiocarbonyl-di-1,2,4-triazole are substituted for N,N'-carbonyldiimidazole or 4,4'-carbonyl-di-1,2,4-triazole.

Lincomycin cyclic carbonate, and lincomycin cyclic thiocarbonate can exist either in the non-protonated (free base) form or the protonated form depending upon the pH of the environment. They form stable protonates (acid addition salts) on neutralization with suitable acids, for example, hydrochloric, hydrobromic, sulfuric, phosphoric, nitric, perchloric, thiocyanic, fluosilicic, acetic, benzoic, salicylic, glycolic, succinic, nicotinic, tartaric, maleic, malic, lactic, methanesulfonic, and cyclohexanesulfamic acids, and the like. These acid addition salts are useful to upgrade the free base.

The compounds produced by the novel processes of the invention are antibacterials. For example, lincomycin cyclic carbonate inhibits the growth of Escherichia coli, and, therefore, is useful for controlling the contamination by this microorganism in used cutting oils and in paper mill systems where Escherichia coli has been associated with slime production.

Further, lincomycin cyclic carbonate inhibits the growth of Klebsiella pneumoniae, Pseudomonas aeruginosa, Salmonella gallinarum, Salmonella schottmuelleri, Staphylococcus albus, Staphylococcus aureus, and Streptococcus faecalis in a brain heart infusion broth test. Therefore, lincomycin cyclic carbonate is useful as a disinfectant on washed and stacked food utensils contaminated with Staphylococcus aureus, or Staphylococcus albus; also, it can be used as a disinfectant on various dental and medical equipment contaminated with these organisms. Further, lincomycin cyclic carbonate can be used as a disinfectant in poultry plants to inhibit the growth of Salmonella gallinarum which has been found to be a causative agent of fowl typhoid; it can also be incorporated into fish meal that is used in animal feed supplements to prevent contamination by Salmonella gallinarum.

The following example is illustrative of the processes of the present invention.

EXAMPLE 1

Lincomycin cyclic carbonate

In a dry 3 liter flask were placed 40.7 gm. (0.1 mole) of lincomycin, 2000 ml. of dry tetrahydrofuran and 16.2 gm. (0.1 mole) of N,N'-carbonyldiimidazole. The solution was stirred at about 40° C. under a nitrogen atmosphere for one hour and the solvent then evaporated under vacuum. The viscous residue was dissolved in 1000 ml. of methylene chloride and extracted vigorously with ten 250-ml. portions of water. The methylene chloride phase was separated, dried over anhydrous magnesium sulfate, filtered, and evaporated under vacuum to yield 35 gm. of lincomycin cyclic carbonate as a white solid, having the following elemental analysis:

Elemental analysis.—Calculated: C, 52.76; H, 7.46; N, 6.48; S, 7.41. Found: C, 52.54; H, 7.66; N, 6.41; S, 7.16.

EXAMPLE 2

By substituting N,N''-carbonyldiimidazole in Example 1 by an equimolar amount of 4,4'-carbonyl-di-1,2,4-triazole, there is produced lincomycin cyclic carbonate.

EXAMPLE 3

Lincomycin cyclic thiocarbonate

In a dry 3-liter flask were placed 34.2 g. (0.08 mole) of lincomycin, 14.9 g. (0.08 mole) of N,N'-thiocarbonyldiimidazole and 2 liters of tetrahydrofuran. This solution was heated at reflux under nitrogen for 6 hours and then evaporated under vacuum at a pot temperature of less than 60°. The viscous residue was shaken with 1500 ml. of ether and 500 ml. of water until solution was complete. The water layer was discarded and the ether layers washed five times with 200 ml. portions of water. The ether layer was then dried over anhydrous MgSO$_4$, filtered and evaporated to dryness under vacuum. The crude residue weighed 23.2 g. Three grams of this material was chromatographed over 300 g. of silica gel (elution with 100% acetone). After discarding a forerun of 250 ml., 20 ml. fractions were collected, and evaporated. Fractions 12–15 were crystalline lincomycin cyclic thiocarbonate (775 mg.), and showed one spot on thin layer chromatography (silica gel, 100% acetone). They were combined and recrystallized from acetone to yield crystals having a melting point of 183–184° C.

*Analysis.*—Calcd. for $C_{19}H_{32}N_2O_6S_2$: C, 50.87; H, 7.19; N, 6.25; S, 14.30. Found: C, 51.10; H, 6.97; N, 6.23; S, 14.19.

EXAMPLE 4

By substituting the N,N'-thiocarbonyldiimidazole in Example 3 by an equimolar amount of 4,4'-thiocarbonyl-di-1,2,4-triazole there is obtained lincomycin cyclic thiocarbonate.

We claim:

1. A process for making lincomycin cyclic carbonate which comprises reacting lincomycin with N,N'-carbonyldiimidazole in an inert solvent for the reactants and isolating the lincomycin cyclic carbonate so produced.

2. A process for making lincomycin cyclic carbonate which comprises reacting equimolar amounts of lincomycin and N,N'-carbonyldiimidazole in tetrahydrofuran and isolating the lincomycin cyclic carbonate so produced.

3. A process for making lincomycin cyclic carbonate which comprises reacting lincomycin with 4,4'-carbonyl-di-1,2,4-triazole in an inert solvent for the reactants and isolating the lincomycin cyclic carbonate so produced.

4. A process for making lincomycin cyclic carbonate which comprises reacting equimolar amounts of lincomycin and 4,4'-carbonyl-di-1,2,4-triazole in tetrahydrofuran and isolating the lincomycin cyclic carbonate so produced.

5. A process for making lincomycin cyclic thiocarbonate which comprises reacting lincomycin with N,N'-thiocarbonyldiimidazole in an inert solvent for the reactants and isolating the lincomycin cyclic thiocarbonate so produced.

6. A process for making lincomycin cyclic thiocarbonate which comprises reacting equimolar amounts of lincomycin and N,N'-thiocarbonyldiimidazole in tetrahydrofuran and isolating the lincomycin cyclic thiocarbonate so produced.

7. A process for making lincomycin cyclic carbonate which comprises reacting equimolar amounts of lincomycin with a compound selected from the group consisting of N,N'-carbonyldiimidazole and 4,4'-carbonyl-di-1,2,4-triazole in tetrahydrofuran and isolating the lincomycin cyclic carbonate so produced.

8. A process for making lincomycin cyclic thiocarbonate which comprises reacting equimolar amounts of lincomycin with a compound selected from the group consisting of N,N'-thiocarbonyldiimidazole and 4,4'-thiocarbonyl-di-1,2,4-triazole in tetrahydrofuran and isolating the lincomycin cyclic thiocarbonate so produced.

No references cited.

LEWIS GOTTS, *Primary Examiner.*

J. R. BROWN, *Assistant Examiner.*